Aug. 12, 1924.
J. P. FULLILOVE
1,504,818
POISON DISTRIBUTOR
Filed Aug. 13, 1923
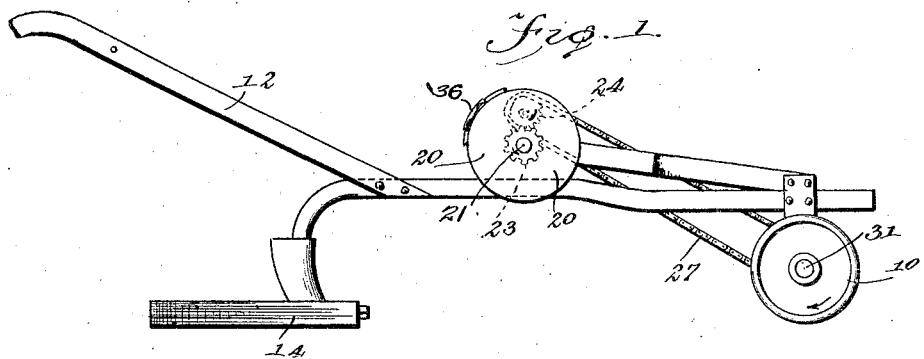
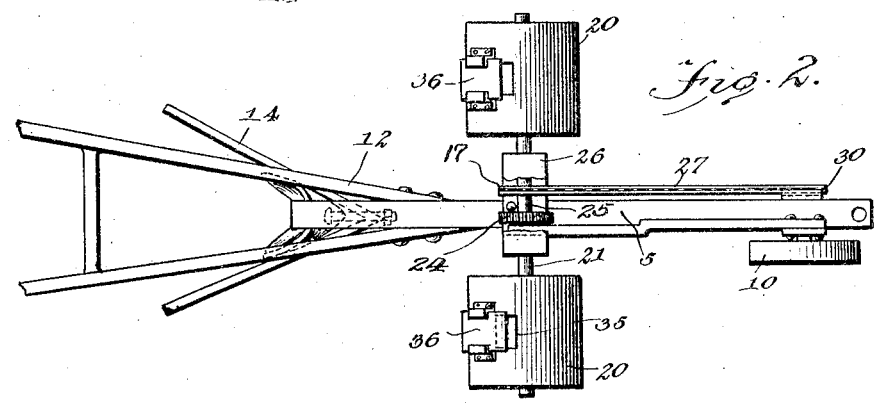
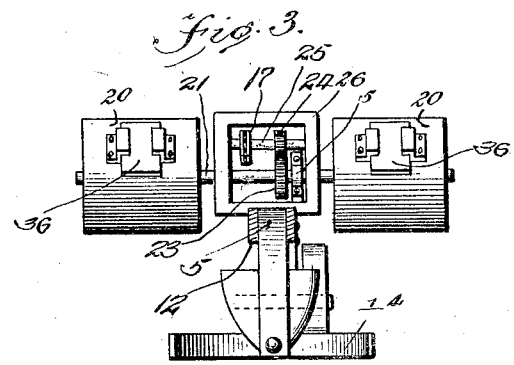
WITNESSES
INVENTOR
J. P. Fullilove,
BY
ATTORNEYS Patented Aug. 12, 1924.

1,504,818

UNITED STATES PATENT OFFICE.

JACK POPE FULLILOVE, OF SHREVEPORT, LOUISIANA.

POISON DISTRIBUTOR.

Application filed August 13, 1923. Serial No. 657,037.

*To all whom it may concern:*

Be it known that I, JACK POPE FULLILOVE, a citizen of the United States, and resident of Shreveport, in the parish of Caddo and State of Louisiana, have invented certain new and useful Improvements in Poison Distributors, of which the following is a specification.

This invention relates to agricultural machinery and more particularly to a means for distributing poison on cotton plants for the purpose of minimizing boll weevil destruction.

Briefly stated an important object is to provide an agricultural machine of the character specified which employs a plurality of combined drums and poison containers which contacts with the cotton plant foliage and applies a portion of the poison to the foliage and the drums by reason of constantly rotating maintain the poison in an agitated state and consequently properly mixed.

A further object is to provide an agricultural machine of the character specified wherein the drums rotate in the direction opposite the direction of travel of the machine so that the drums will wipe the undersides of the foliage and thereby thoroughly apply the liquid to the proper places on the cotton plants.

A further object is to provide a machine of the character specified which is of highly simplified construction, efficient in use and cheap to manufacture.

Other objects and advantages will be apparent during the course of the following description.

In the accompanying drawing forming a part of this application and in which like numerals are employed to designate like parts throughout the same, Figure 1 is a side elevation of a poison distributor constructed in accordance with this invention.

Figure 2 is a plan view of the same.

Figure 3 is a rear elevation of the machine as shown in Figure 1 with the handles broken away and shown in section.

In the drawing wherein for the purpose of illustration is shown a preferred embodiment of the invention the numeral 5 designates a beam, the forward end of which may be provided with a wheel 10. The rear end of the beam is provided with handles 12 and with a skid member 14 of any desired type.

The principal feature of this invention resides in the provision of a pair of drums 20 mounted upon a shaft 21. The shaft 21 is provided with a gear 23 which meshes with a gear 24 on a counter-shaft 25 carried by a frame 26. Figure 3 illustrates that a sprocket wheel 17 is mounted upon the counter-shaft 25 and is connected to a sprocket chain 27, the forward end of which is trained about a sprocket wheel 30 on the axle 31 of the wheel 10.

In carrying out the invention the drum may be provided with discharge means 35 which are partly or completely covered by means of adjusting devices 36. When the drums 20 are rotated a portion of the liquid is discharged and applied to the foliage of the cotton plants.

It will be seen that the drums act as poison containers and consequently the poison which is in a liquid state is maintained in a well agitated state and consequently may be applied efficiently to the foliage of the cotton plants.

Furthermore the drum 20 rotates in the direction opposite the direction of travel of the machine and consequently wipes the under side of the foliage and applies the poison thereto for minimizing the destruction by the boll weevil.

With reference to the foregoing description taken in connection with the accompanying drawing it will be seen that I have discovered two new principles which I believe to be broadly new. The first is the means employed for applying and constantly agitating the poison liquid to be applied to the foliage. The second principle is the fact that the drums rotate in the direction opposite the direction of travel of the machine and consequently apply the poison to the under side of the cotton leaves.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:—

1. A poison distributor comprising a beam, a shaft extending transversely thereof and having its ends provided with drums adapted for containing and applying poison liquid, and means whereby to rotate the drum in the direction opposite the direction of travel of the machine.

2. An agricultural machine of the character specified comprising a pair of combined poison containers and distributors, and means whereby to support the distributors for movement through a cotton field, and to rotate the distributors in a direction opposite to the direction of travel of the machine.

3. A machine of the character specified comprising a pair of poison containing and distributing drums having discharge means, and means whereby to rotate the drums opposite the direction of travel of the machine whereby the poison therein is maintained in an agitated state.

4. An agricultural machine of the character specified comprising a beam, a shaft extended transversely thereof, combined poison containing and distributing drums mounted upon said shaft and having discharge means, a gear secured to said shaft, a second gear engaging said first named gear, a counter-shaft supporting the second named gear, a wheel carried by said frame, and means establishing a driving connection between said wheel and said second named gear whereby the drums are rotated in the direction opposite the direction of travel of the machine whereby to apply the poison to the under sides of the cotton leaves.

JACK POPE FULLILOVE.